US012574820B2

(12) United States Patent
Jordanov et al.

(10) Patent No.: US 12,574,820 B2
(45) Date of Patent: Mar. 10, 2026

(54) ARTIFICIAL-INTELLIGENCE BASED ROUTING POLICIES FOR WIRELESS DATA TRANSMISSION

(71) Applicant: Samsung Electronics Company, Ltd., Suwon-si (KR)

(72) Inventors: Alexi Georgiev Jordanov, New Westminster (CA); Erick Wong, Vancouver (CA)

(73) Assignee: SAMSUNG ELECTRONICS COMPANY, LTD., Suwon City (KR)

( * ) Notice: Subject to any disclaimer, the term of this patent is extended or adjusted under 35 U.S.C. 154(b) by 344 days.

(21) Appl. No.: 18/334,257

(22) Filed: Jun. 13, 2023

(65) Prior Publication Data

US 2024/0422647 A1 Dec. 19, 2024

(51) Int. Cl.
*H04W 40/02* (2009.01)
*G06N 3/0442* (2023.01)

(52) U.S. Cl.
CPC .......... *H04W 40/02* (2013.01); *G06N 3/0442* (2023.01)

(58) Field of Classification Search
CPC ............................. H04W 40/02; G06N 3/0442
See application file for complete search history.

(56) References Cited

U.S. PATENT DOCUMENTS

| | | | |
|---|---|---|---|
| 2004/0156345 A1 | 8/2004 | Steer | |
| 2004/0246975 A1 | 12/2004 | Joshi | |
| 2013/0010946 A1 | 1/2013 | Clark | |
| 2015/0195126 A1 | 7/2015 | Vasseur | |
| 2020/0177311 A1* | 6/2020 | Ho | H04L 1/0002 |
| 2021/0021883 A1* | 1/2021 | Parekh | H04N 21/237 |

* cited by examiner

*Primary Examiner* — Jae Y Lee
*Assistant Examiner* — Nick Anon Sundara
(74) *Attorney, Agent, or Firm* — Baker Botts L.L.P.

(57) ABSTRACT

In one embodiment, a method includes by one or more computing devices: receiving, from a wireless client device via wireless gateway devices, a data stream including data packets, where each data packet includes context data corresponding to a prior context of the wireless client device when sending the data packet, analyzing, using a machine-learning model, one or more transmission metrics based on the reception of the data packets from the wireless gateway devices and the context data of the data packets, and generating, using the machine-learning model, a wireless route policy to configure data transmission of the wireless client device based on the one or more transmission metrics and a current context of the wireless client device, where the wireless route policy specifies rules for sending data packets via wireless gateway devices based on the current context of the wireless client device.

20 Claims, 7 Drawing Sheets

100

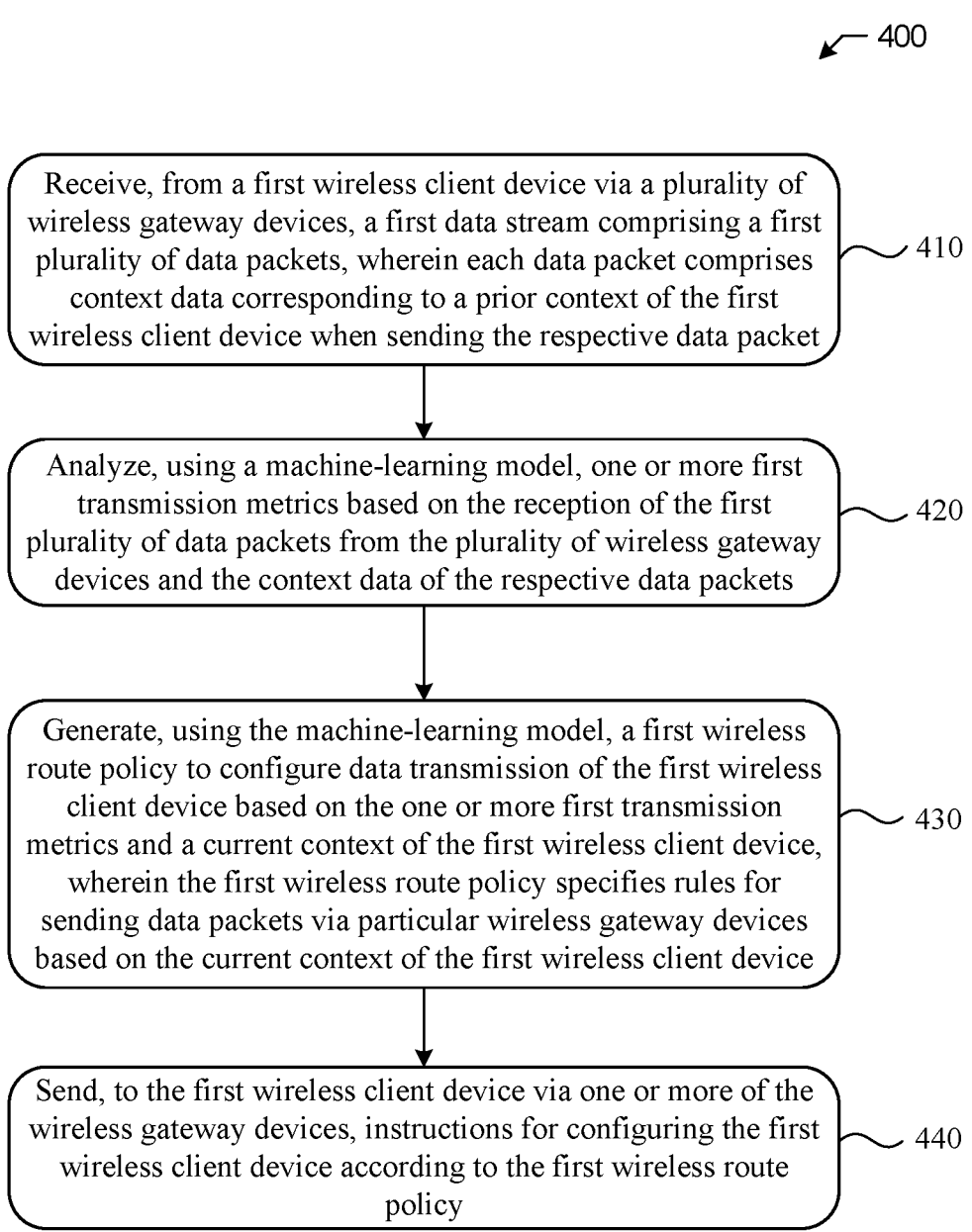

400

Receive, from a first wireless client device via a plurality of wireless gateway devices, a first data stream comprising a first plurality of data packets, wherein each data packet comprises context data corresponding to a prior context of the first wireless client device when sending the respective data packet — 410

Analyze, using a machine-learning model, one or more first transmission metrics based on the reception of the first plurality of data packets from the plurality of wireless gateway devices and the context data of the respective data packets — 420

Generate, using the machine-learning model, a first wireless route policy to configure data transmission of the first wireless client device based on the one or more first transmission metrics and a current context of the first wireless client device, wherein the first wireless route policy specifies rules for sending data packets via particular wireless gateway devices based on the current context of the first wireless client device — 430

Send, to the first wireless client device via one or more of the wireless gateway devices, instructions for configuring the first wireless client device according to the first wireless route policy — 440

*Fig. 4*

ARTIFICIAL-INTELLIGENCE BASED ROUTING POLICIES FOR WIRELESS DATA TRANSMISSION

TECHNICAL FIELD

This disclosure relates generally to database and file management within network environments, and in particular relates to wireless data transmission.

BACKGROUND

Data communication or digital communications, including data transmission and data reception, is the transfer and reception of data in the form of a digital bitstream or a digitized analog signal transmitted over a point-to-point or point-to-multipoint communication channel. Examples of such channels are copper wires, optical fibers, wireless communication using radio spectrum, storage media and computer buses. The data are represented as an electromagnetic signal, such as an electrical voltage, radio wave, microwave, or infrared signal.

Data transmitted may be digital messages originating from a data source, for example, a computer or a keyboard. It may also be an analog signal such as a phone call or a video signal, digitized into a bit-stream, for example, using pulse-code modulation or more advanced source coding schemes. This source coding and decoding is carried out by codec equipment.

BRIEF DESCRIPTION OF THE DRAWINGS

FIG. 4 illustrates an example method for wireless data transmission.

DESCRIPTION OF EXAMPLE EMBODIMENTS

Machine-Learning System Overview

Figure 1:
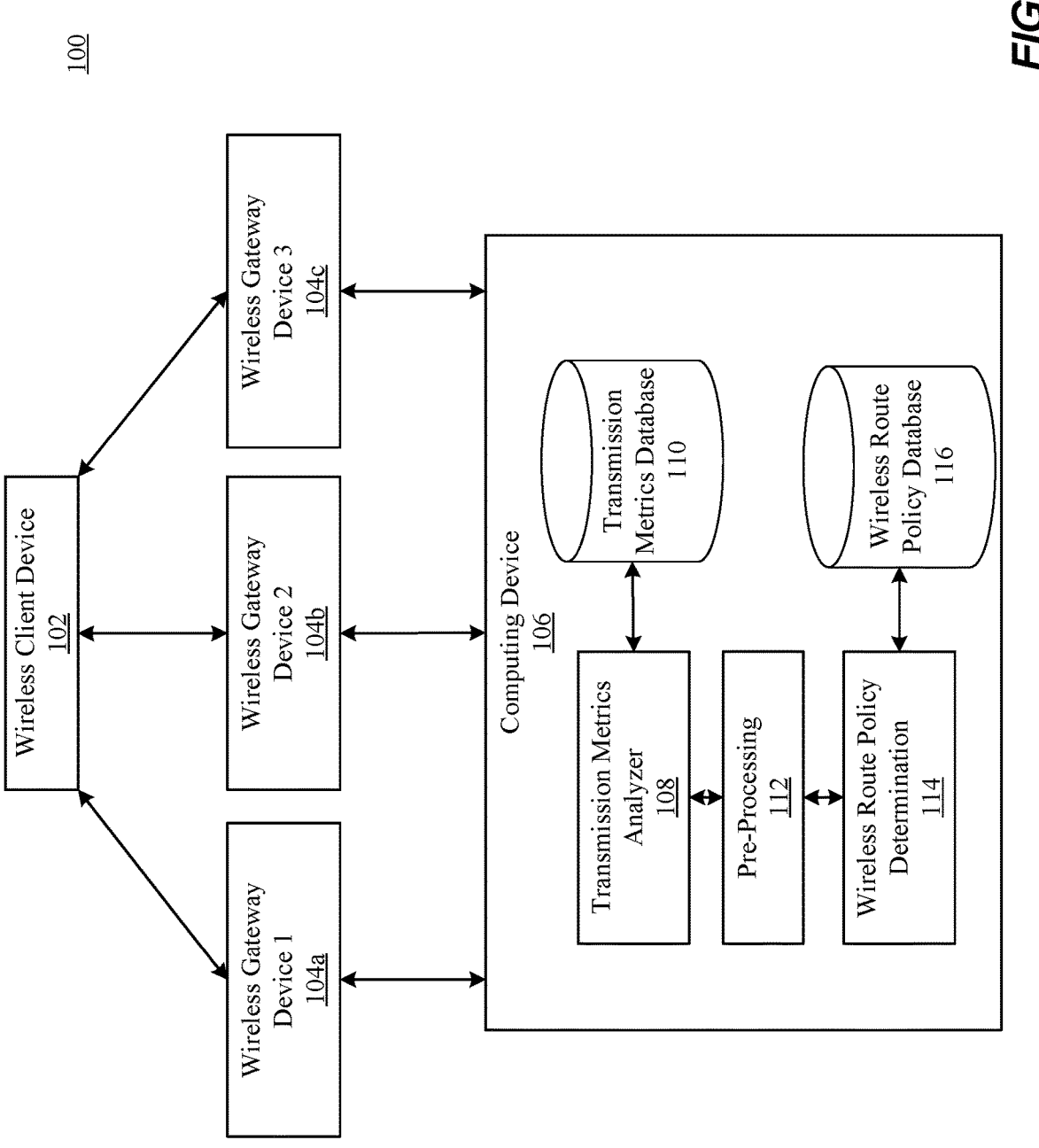
FIG. 1 illustrates an example wireless data transmission system.

FIG. 1 illustrates an example wireless data transmission system 100. As depicted by FIG. 1, the wireless data transmission system 100 may include a wireless client device 102, wireless gateway device 1 104a, wireless gateway device 2 104b, wireless gateway device 3 104c, and a computing device 106. In particular embodiments, the wireless client device 102 may be embodied as one or more of a mobile phone, smartphone, wearable device, smart appliance, laptop, any other device to collect data, or a combination of the like. In particular embodiments, the data collected by the wireless client device 102 may be embodied as one or more of sensor data, transmission metrics corresponding to the sensor data, context data, data associated with the wireless client device 102, and the like. In particular embodiments, the wireless gateway devices 104 may be embodied as one or more of a mobile phone, smartphone, laptop, any other device to be used as a gateway to transmit data, or a combination of the like. In particular embodiments, the computing device 106 may be embodied as one or more of a cloud-based cluster computing architecture, client-based computing architecture, or other similar computing architecture that may receive data from the wireless client device 102. In particular embodiments, the computing device 106 may include a transmission metrics analyzer 108, a transmission metrics database 110, a pre-processing functional block 112, a wireless route policy determination functional block 114, and a wireless route policy database 116. In particular embodiments, the transmission metrics analyzer 108, pre-processing functional block 112, and wireless route policy determination functional block 114 may include a computing engine. In particular embodiments, the computing device 106 may process and manage various analytics and/or data intelligence such as to determine a wireless route policy that may be sent to the wireless client device 102 to configure to send data in a particular manner. As an example and not by way of limitation, the wireless route policy may specify one or more of which wireless gateway devices 104a-104c to send collected data from the wireless client device 102 to the computing device 106. Although not shown, the computing device 106 may include one or more databases to store the data from the wireless client device 102.

In particular embodiments, the wireless client device 102 may store a wireless route policy to configure the wireless client device 102 to send data collected by the wireless client device 102 to a computing device 106 through one or more wireless gateway devices 104. While this disclosure only shows one wireless client device 102, there may be any number of wireless client devices that may use one or more wireless gateway devices 104 to send data to the computing device 106. In particular embodiments, the wireless client device 102 may use context data to send data through one or more wireless gateway devices 104. As an example and not by way of limitation, for a given time during the day, the wireless client device 102 may use wireless gateway device 1 104a and wireless gateway device 2 104b to send a data stream to the computing device 106. In particular embodiments, the data stream may include a plurality of data packets, where each data packet may comprise context data corresponding to a prior context of the wireless client device 102 when sending the respective data packet. In particular embodiments, the data packets may be received by the computing device 106 to compile into the data stream. As an example and not by way of limitations, if the data stream included 16 bits and the wireless route policy specified a 50/50 split on transmitting data between wireless gateway device 1 104a and wireless gateway device 2 104b, then the wireless client device 102 may generate two data packets (each 8 bits) to send through the respective wireless gateway device 104. The two data packets may be received by the computing device to be processed to generate the data stream the wireless client device 102 sent. In particular embodiments, the wireless client device 102 may process collected data in any suitable manner to generate a data stream and data packets to send to a computing device 106 via the wireless gateway devices 104.

In particular embodiments, each of the wireless gateway devices 104 may receive one or more data packets from the wireless client device 102 to send to the computing device 106. While this disclosure shows three wireless gateway devices 104, this disclosure contemplate any number of wireless gateway devices 104. In particular embodiments, the wireless client device 102 may send transmission metrics corresponding to the data packets. In particular embodiments, the wireless gateway devices 104 may process the data packets and generate transmission metrics to send to the computing device. As an example and not by way of limitation, the transmission metrics may include one or more of signal strength (e.g., Wi-Fi strength, Bluetooth strength, etc.) corresponding to the connection between the wireless client device 102 and a respective wireless gateway device 104, data packet transfer efficiency, power consumption efficiency, bandwidth, and the like. In particular embodiments, the wireless gateway devices 104 may receive a wireless route policy from the computing device 106 to send to the wireless client device 102. In particular embodiments, the wireless route policy may comprise a version number. In particular embodiments, the wireless client device 102 may receive a wireless route policy and store the wireless route policy that is most up-to-date or the latest version based on the version number.

In particular embodiments, the computing device 106 may generate a wireless route policy. In particular embodiments, the wireless route policy may include instructions to configure data transmission of a wireless client device 102 based on transmission metrics of the data sent through the wireless gateway devices 104. In particular embodiments, the computing device 106 may receive one or more transmission metrics from the wireless gateway devices 104. The computing device 106 may store the transmission metrics in the transmission metrics database 110. In particular embodiments, the computing device 106 may process one or more data packets from the wireless gateway devices 104 to generate a data stream originally sent by the wireless client device 102 as described herein. As an example and not by way of limitation, the computing device 106 may compile one or more data packets to generate the data stream sent by the wireless client device 102 via the wireless gateway devices 104. In particular embodiments, the computing device 106 may use the transmission metrics analyzer 108 to generate one or more transmission metrics based on the reception of the data packets from the wireless gateway devices 104. In particular embodiments, the one or more transmission metrics may indicate a context associated with receiving the one or more data packets. In particular embodiments, the transmission metrics analyzer may include a machine-learning model to process the data received from the wireless gateway devices 104 to generate the one or more transmission metrics. In particular embodiments, the transmission metrics analyzer may periodically analyze the data packets received to determine the one or more transmission metrics. In particular embodiments, the transmission metrics may be stored in the transmission metrics database. In particular embodiments, the pre-processing functional block 112 may send the preprocessed data to the wireless route policy determination functional block 114.

In particular embodiments, the wireless route policy determination functional block 114 may process the data received from either the transmission metrics analyzer 108 or the pre-processing functional block 112 to generate a wireless route policy for the wireless client device 102. The wireless route policy may customize the data transmission to reduce the bandwidth utilized on certain wireless gateway devices 104, improve the transmission efficiency of the data sent via the wireless gateway devices 104 by determining which of the wireless gateway devices 104 have the highest level of success. The transmission metrics may indicate which combinations of wireless gateway devices 104 may be best used to successfully transmit the data from the wireless client device 102 to the computing device 106 via the wireless gateway devices 104. In particular embodiments, the wireless route policy may indicate one or more combinations of wireless gateway devices 104 a wireless client device 102 may use depending on whether the wireless client device 102 is able to connect to one or more of the wireless gateway devices 104. As an example and not by way of limitation, if the wireless gateway devices 1 and 2 104a, 104b are connected to the wireless client device 102, then the wireless client device 102 may use both of the wireless gateway devices 104a, 104b based on the wireless route policy. The wireless route policy may specify that the wireless client device 102 send 70% of the data being sent out in a through wireless gateway device 1 104a to the computing device 106 and 30% of the data through wireless gateway device 2 104b to the computing device 106. In particular embodiments, the wireless route policy determination functional block 114 may store the wireless route policy in the wireless route policy database 116. In particular embodiments, the wireless route policy determination functional block 114 may use one or more stored wireless route policy to generate or update a wireless route policy for a wireless client device 102. In particular embodiments, the wireless route policy may include an identifier for the wireless client device 102 and a version number of the wireless route policy.

In particular embodiments, the pre-processing functional block 112 may also be utilized, for example, to split the data corresponding to the transmission metrics in an N number of datasets before providing to a machine-learning model (used by the wireless route policy determination functional block 114) for training, cross-validating, and testing. Thus, in particular embodiments, the pre-processing functional block 112 may perform the pre-processing by, for example, accounting for the existence of one or more disjoint groups within a population and generating samples where the proportion of these groups is maintained. In particular embodiments, the pre-processing functional block 112 can process the data corresponding to the transmission metrics in a buffer prior to sending to the machine-learning model.

In particular embodiments, a final pre-processing of the data corresponding to the transmission metrics may be performed before providing an output to the machine-learning model for training, cross-validating, and testing. For example, in particular embodiments, the machine-learning model may receive an N number of datasets (e.g., N arrays of data corresponding to the transmission metrics in 200 ms timeslots) generate an N number of long short term (LSTM) layers based thereon. In particular embodiments, outputs of the LSTM layers of the machine-learning model may be combined into a single array utilizing, for example, a concatenation layer of the machine-learning model. From the concatenation layer, the machine-learning model may then transfer the single array through one or more dense layers of the machine-learning model. As another example and not by way of limitation, reinforcement learning may be used for the machine-learning model.

In particular embodiments, from the one or more dense layers, the machine-learning model may then transfer the single array through a sigmoid output layer of the machine-learning model. In particular embodiments, the sigmoid output layer of the machine-learning model may include, for example, a number of neurons (e.g., the number of neurons may be equal to the number of classes and/or classification labels) that may be utilized to classify the single array into individual classes, in which one or more final probabilities for individual classification labels may be calculated. In particular embodiments, ReLU may be used instead of the sigmoid output layer. In particular embodiments, a machine-learning model with an ReLU activation function may quickly converge. In particular embodiments, training and actual data may be rationed for the machine-learning model.

In particular embodiments, the machine-learning model may also include a loss function that may be utilized to assign a higher weight to positive classification for individual classification labels, assuming that individual users and/or subgroups of users may typically not exceed more than a maximum number of users (e.g., N users).

Artificial-Intelligence Based Routing Policies for Wireless Data Transmission

In particular embodiments, a wireless client device may collect and send data to another device. As an example and not by way of limitation, a smartphone may collect step tracking data as a user is walking and send the step tracking data to a third-party server. The wireless client device may be any device that is able to collect data and send the data to another device as described herein. As an example and not by way of limitation, the wireless client device may be a smartwatch. The wireless client device may connect to multiple wireless gateway devices. As an example and not by way of limitation, a smartwatch may be connected to multiple smartphones. For instance, the smartwatch may use Bluetooth pairing to connect to multiple smartphones. The wireless client device may have data policies providing instructions on what sensors to be used, what data to be collected, what time to collect data, and the frequency for collecting data. The data policies may correspond to the wireless route policy of the wireless client device. In particular embodiments, a user may register one or more devices (e.g., wireless client device, wireless gateway device, etc.) to an account of a service. As an example and not by way of limitation, a user may create an account for a fitness tracking application and register a smartwatch and smartphones to be associated with the account for the fitness tracking application. In particular embodiments, the connections between one or more of a wireless client device, wireless gateway devices, or computing device may be validated. As an example and not by way of limitation, a connection between a smartphone (as a wireless gateway device) and a server may be validated. In particular embodiments, the computing device may push out a wireless route policy to the wireless client device to configure the data transmission of the wireless client device. In typical data transmission systems, the data sent through one or more gateways may take too long, result in unsuccessful transmission, and the like. To address these issues, a machine-learning model may be used to generate and optimize a wireless route policy that is sent to the wireless client device to configure the data transmission of the wireless client device.

Certain technical challenges exist for wireless data transmission. One technical challenge may include sending data via gateways in the condition of unreliable connections, weak signals, and dropping signals. The solution presented by the embodiments disclosed herein to address this challenge may be to use a machine-learning model to generate a wireless route policy to configure a wireless client device to send data via the gateways that have been identified as yielding more success (e.g., completed transfers). Another technical challenge may include bandwidth issues corresponding to wireless data transmission over one or more gateways. The solution presented by the embodiments disclosed herein to address this challenge may be using a machine-learning model to generate a wireless route policy to configure a wireless client device to send data over several gateways to avoid any unnecessary bandwidth use resulting in inability to establish connections, overloading connections, or reducing data transfer speed. Another technical challenge may include selecting the time period to send data out. As an example and not by way of limitation, sending data during a peak usage of bandwidth may result in unsuccessful data transfers. The solution presented by the embodiments disclosed herein to address this challenge may be using a machine-learning model to generate wireless route policy to configure a wireless client device to send data over several gateways at a specific time of the day.

Certain embodiments disclosed herein may provide one or more technical advantages. A technical advantage of the embodiments may include increased success rate in data transmission from a wireless client device to a computing device via one or more wireless gateway devices. Another technical advantage may include optimized routing of data packets from a wireless client device to a computing device through several wireless gateway devices. Another technical advantage may include an increased size of data transmitted from a wireless client device to a computing device. Another technical advantage may include increased data transmission speed. Another technical advantage may include decreased battery usage to transmit data. Certain embodiments disclosed herein may provide none, some, or all of the above technical advantages. One or more other technical advantages may be readily apparent to one skilled in the art in view of the figures, descriptions, and claims of the present disclosure.

In particular embodiments, one or more computing devices (e.g., a computing device including a wireless route policy determination functional block) may receive a data stream comprising a plurality of data packets. In particular embodiments, the one or more computing devices may receive the data stream from a wireless client device via a plurality of wireless gateway devices. As an example and not by way of limitation, a server may receive a data stream from a smartwatch through multiple smartphones. In particular embodiments, each data packet may comprise context data corresponding to a prior context of the wireless client device when sending the respective data packet. As an example and not by way of limitation, each data packet may comprise data corresponding to a time when the wireless client device sent out the respective data packet or when the data packet is received by a wireless gateway device or received by a computing device. As another example and not by way of limitation, each data packet may comprise data corresponding to a location of the wireless client device when the respective data packet was sent. In particular embodiments, the one or more computing devices may receive another data stream from another wireless client device. As an example and not by way of limitation, the one or more computing devices may receive data streams from several wireless client devices. For instance, a server may receive sensor data from a plurality of smartwatches via a plurality of smartphones that are wirelessly coupled to the plurality of smartwatches. In particular embodiments, the one or more computing devices may compile the plurality of data packets received from the plurality of wireless gateway devices to generate the data stream. Although this disclosure describes receiving a data stream in a particular manner, this disclosure contemplate receiving a data stream in any suitable manner.

In particular embodiments, the one or more computing devices may analyze one or more transmission metrics based on the reception of the plurality of data packets from the plurality of wireless gateway devices. In particular embodiments, the one or more computing devices may use a machine-learning model to analyze the one or more transmission metrics and the context data of the respective data packets. In particular embodiments, the one or more transmission metrics may be based on the generation of the data stream from the plurality of data packets. As an example and not by way of limitation, the transmission metrics may be determined based on the data packets received by the one or more computing devices and the generation of the data stream from the data packets. The one or more computing devices can determine whether the data packets were successfully transferred and determine one or more transmission metrics based on the success rate and other metrics. In particular embodiments, the one or more wireless gateway devices may determine one or more transmission metrics from the reception of the data packets from the wireless client device. In particular embodiments, the one or more computing devices may receive the one or more transmission metrics from the one or more wireless gateway devices. In particular embodiments, the transmission metrics may correspond to the metrics associated with the data transfer from one or more of between the wireless client device and each respective wireless gateway device or between the wireless gateway devices and the one or more computing devices. Although this disclosure describes analyzing one or more transmission metrics in a particular manner, this disclosure contemplates analyzing one or more transmission metrics in any suitable manner.

In particular embodiments, the one or more computing devices may generate a wireless route policy to configure data transmission of the wireless client device. In particular embodiments, the one or more computing devices may use a machine-learning model to generate a wireless route policy to configure data transmission of the wireless client device based on the one or more first transmission metrics and a current context of the wireless client device. In particular embodiments, the machine-learning model may use one or more wireless route policy parameters to generate the wireless route policy. In particular embodiments, the wireless route policy parameters may include one or more of transmission metrics of wireless client devices sending data on the network via the wireless gateway devices and a context of the wireless client devices. As an example and not by way of limitation, the wireless route policy parameters may include a context of when one or more data packets were received from one or more wireless gateway devices. For instance, the context may indicate one or more of a location of the wireless client device or a time a data packet was sent or received. In particular embodiments, the wireless route policy may specify rules for sending the data packets via particular wireless gateway devices based on the current context of the wireless client device. As an example and not by way of limitation, the wireless route policy may specify the wireless client device to send data via a combination of two different wireless gateway devices during a particular time of day. As another example and not by way of limitation, the wireless route policy may specify the wireless client device to send data via a combination of four different wireless gateway devices based on the location of the wireless client device with respect to the each of the wireless gateway devices. In particular embodiments, the wireless route policy may specify one or more of time-based rules, location-based rules, or bandwidth-based rules for the wireless client device to send the data packets via the particular wireless gateway devices. In particular embodiments, the wireless route policy may specify the wireless client device may send one or more data packets to the one or more computing devices through a first wireless gateway device for a first context and send one or more data packets to the one or more computing devices through a second wireless gateway device for a second context based on the wireless route policy. Although this disclosure describes generating a wireless route policy in a particular manner, this disclosure describes generating a wireless route policy in any suitable manner.

In particular embodiments, the one or more computing devices may send instructions for configuring the wireless client device according to the wireless route policy. After the one or more computing devices generates the wireless route policy, the one or more computing devices may send the wireless route policy to push out to the wireless client device. Upon receiving the wireless route policy from one or more wireless gateway devices, the wireless client device may determine whether it has the latest version of the wireless route policy. If the wireless client device has an outdated version, the wireless client device may update the previous wireless route policy. In particular embodiments, the wireless client device may replace the current wireless route policy with the latest wireless route policy it receives from one or more wireless gateway device. The wireless client device may then be configured to perform data transmission based on the wireless route policy. Although this disclosure describes sending instructions for configuring a wireless client device in a particular manner, this disclosure contemplates sending instructions for configuring a wireless client device in any suitable manner.

In particular embodiments, the one or more computing devices may receive a second data stream from a wireless client device following the configuration of the wireless client device according to the wireless route policy. The one or more computing devices may reiterate the process of analyzing the one or more transmission metrics of the data packets associated with the data stream and generating an updated wireless route policy based on the latest one or more transmission metrics as described herein. In particular embodiments, the one or more computing devices may store metadata on which wireless client devices have a particular wireless route policy. As an example and not by way of limitation, the one or more computing devices may comprise or have access to a wireless route policy database that contains information for wireless client devices associated with the one or more computing devices (e.g., have been connected via a service as described herein) and the wireless route policy corresponding to the wireless client devices. In particular embodiments, the one or more computing devices may determine whether an updated wireless route policy would improve data transmission by a threshold level. In particular embodiments, the one or more computing devices may determine whether the updated wireless route policy would improve one or more of a success rate on data transmission, reduce bandwidth across heavily trafficked wireless gateway devices, improve speed of transfer on data transmission, and the like by a threshold level. As an example and not by way of limitation, the one or more computing devices may determine whether the updated wireless route policy would improve the data transmission by 10%. In particular embodiments, the one or more computing devices may analyze the one or more transmission metrics from a plurality of wireless client devices. As an example and not by way of limitation, a user may register two smartwatches to send data to a service through three smartphones located in the residence of the user. The one or more computing devices may analyze the one or more transmission metrics from the data transmission from each wireless client device within a threshold distance of each other that are using one or more of the same wireless gateway devices. In particular embodiments, a user may need to approve of each device in the network of the data transmission system. As an example and not by way of limitation, the user may need to connect each device (e.g., wireless client device, wireless gateway device) to a server (e.g., one or more computing devices). In particular embodiments, the user may enable a feature of optimizing the data transmission across the network. In particular embodiments, the one or more computing devices may generate a wireless route policy that may configure each wireless client device to send data packets in a particular manner. As an example and not by way of limitation, the wireless route policy may specify a first wireless client device sends 60% of data through a first wireless gateway device and 40% of data through a second wireless gateway device and specify a second wireless client device sends 40% of data through a first wireless gateway device and 60% of data through a second wireless gateway device. In particular embodiments, the wireless route policy may specify speeds of data transfer to optimize the data transmission in the network. As an example and not by way of limitation, the wireless route policy may specify that a wireless client device may send data to one or more computing devices at a rate of 15 Mbps through a wireless gateway device and another wireless client device may send data to one or more computing devices at a rate of 20 Mbps through the wireless gateway device. Although an example of only two wireless client devices and two wireless gateway devices are described, this disclosure contemplates any number of wireless client devices used and any number of wireless gateway devices used in any particular configuration based on the wireless route policy. Although this disclosure describes receiving a data stream in a particular manner, this disclosure contemplates receiving a data stream in any suitable manner.

Figure 2:
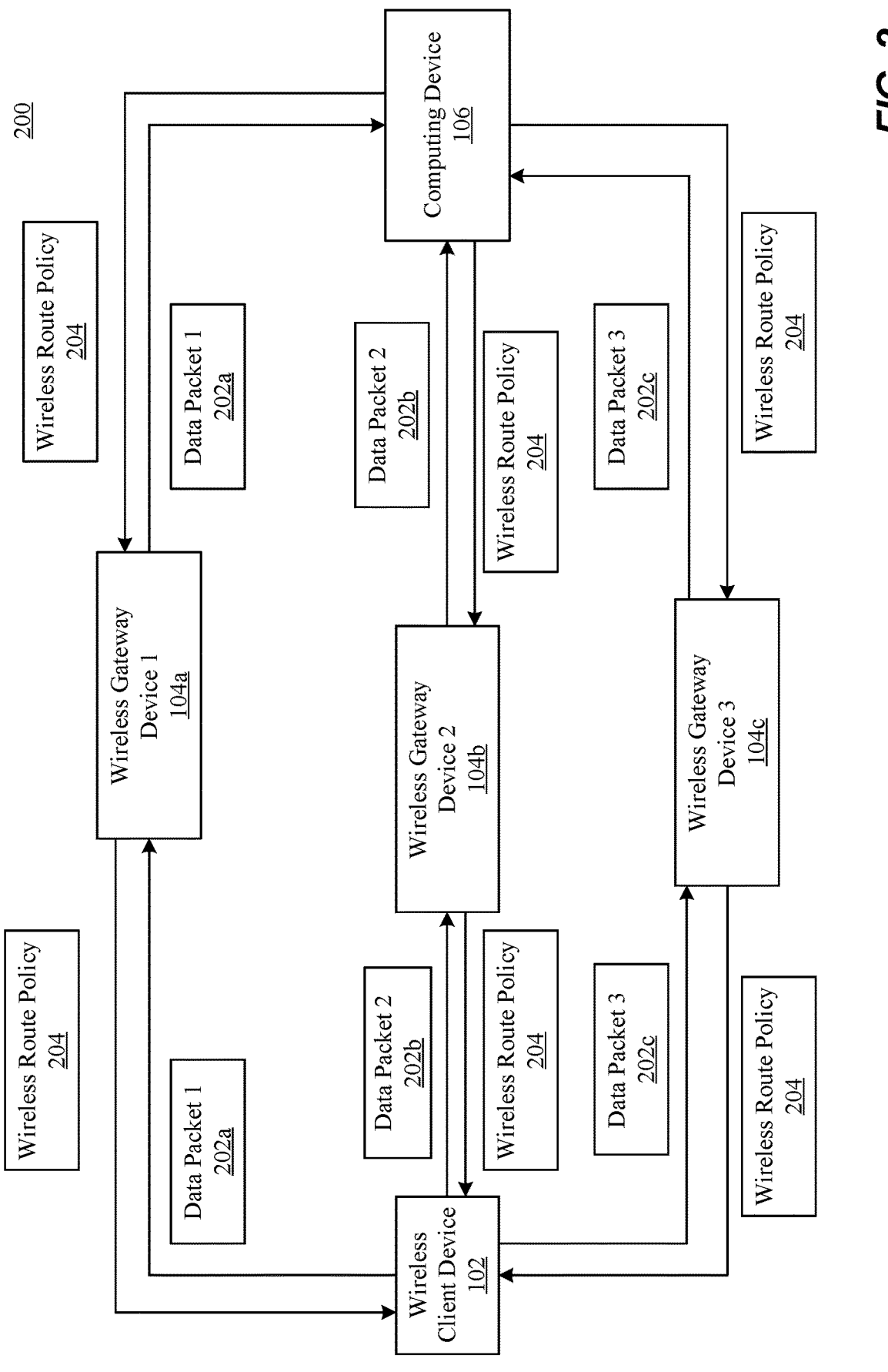
FIG. 2 illustrates another example wireless data transmission system.

FIG. 2 illustrates an example wireless data transmission system 200. In particular embodiments, the wireless data transmission system 200 may have similar components as the system 100. In particular embodiments, the wireless data transmission system 200 may comprise a wireless client device 102, wireless gateway devices 1-3 104a-104c, and a computing device 106. Although this figure illustrates a particular number of components in a particular arrangement, this disclosure contemplates a system with any number of components in any suitable arrangement. As an example and not by way of limitation, there may be two wireless client devices and five wireless gateway devices used to transmit data to the computing device. In particular embodiments, the wireless client device 102 may be preconfigured to collect data to send to a computing device 106. The wireless client device 102 may collect data from one or more sensors and the like. In particular embodiments, the wireless client device 102 may generate a data stream based on the collected data to send to the computing device 106. In particular embodiments, the wireless client device 102 may initially receive a wireless route policy that specifies how to transmit data to the computing device 106. The wireless client device 102 may use the wireless gateway devices 1-3 104a-104c to transmit the data corresponding to the data stream to the computing device. In particular embodiments, the wireless client device 102 may break down the data stream into a plurality of data packets 1-3 202a-202c to send through the corresponding wireless gateway devices 1-3 104a-104b. In particular embodiments, the wireless client device 102 may break down the data stream into a plurality of data packets 202 based on a wireless route policy 204 stored on the wireless client device 102. In particular embodiments, the wireless route policy 204 may specify that the wireless client device 102 send a data packet 1 202a through wireless gateway device 1 104a, a data packet 2 202b through a wireless gateway device 2 104b, and a data packet 3 202c through a wireless gateway device 3 104c. In particular embodiments, the wireless gateway devices 1-3 104a-104c may transfer the data packets 1-3 202a-202c, respectively, to the computing device 106. In particular embodiments, the wireless gateway devices 1-3 104a-140c may determine one or more transmission metrics corresponding to the transfer of the data packets 1-3 202a-202c, respectively. As an example and not by way of limitation, the wireless gateway device 1 may determine the transmission metrics when receiving the data packet 1 202a. In particular embodiments, context data may also be sent with the data packets 1-3 202a-202c. In particular embodiments, the wireless gateway devices 1-3 104a-104c may send one or more of the transmission metrics, context data, and data packets 202 to the computing device. In particular embodiments, the computing device 106 may receive the data packets 1-3 202a-202c to compile into the data stream. The computing device 106 may analyze the data to determine the one or more transmission metrics corresponding to the data packets 1-3 202a-202c. As an example and not by way of limitation, the computing device 106 may determine one or more of transfer speed, success rate, bandwidth used, and the like. In particular embodiments, the computing device 106 may use a machine-learning model to determine a wireless route policy 204 for the wireless client device 102. In particular embodiments, the computing device 106 may send the wireless route policy 204 to the wireless client device 102 over multiple wireless gateway devices 1-3 104a-104c. In particular embodiments, the computing device 106 may determine which wireless gateway device 1-3 104a-104c has the highest success rate or efficiency for data transfer to select that wireless gateway device 104 to send the wireless route policy 204 to the wireless client device. The wireless route policy 204 may be passed through the wireless gateway devices 104 to the wireless client device 102, where the wireless client device 102 may store and configure its data transmission based on the received wireless route policy 204. The wireless client device 102 may determine whether the received wireless route policy 204 is the latest wireless route policy 204 the wireless client device 102 has received to determine whether to update the wireless route policy 204 stored on the wireless client device 102. In particular embodiments, the wireless data transmission system 200 may include multiple wireless client devices 102, where the computing device 106 would generate a wireless route policy 204 that accommodates the additional bandwidth used by the additional wireless client devices 102 as described herein.

Figure 3A:
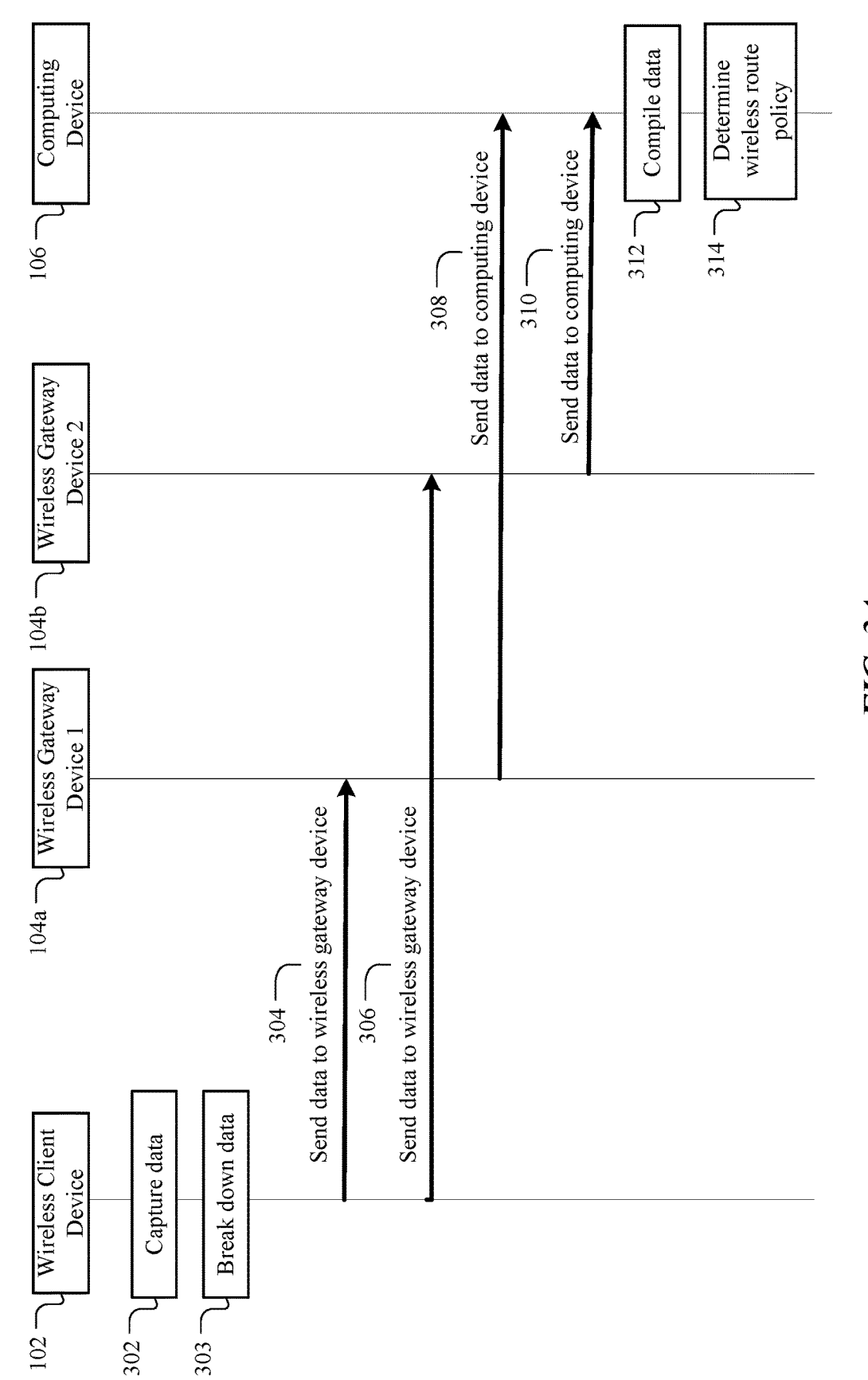
FIGS. 3A-3B illustrate an example process flow of a wireless data transmission system.
Figure 3B:
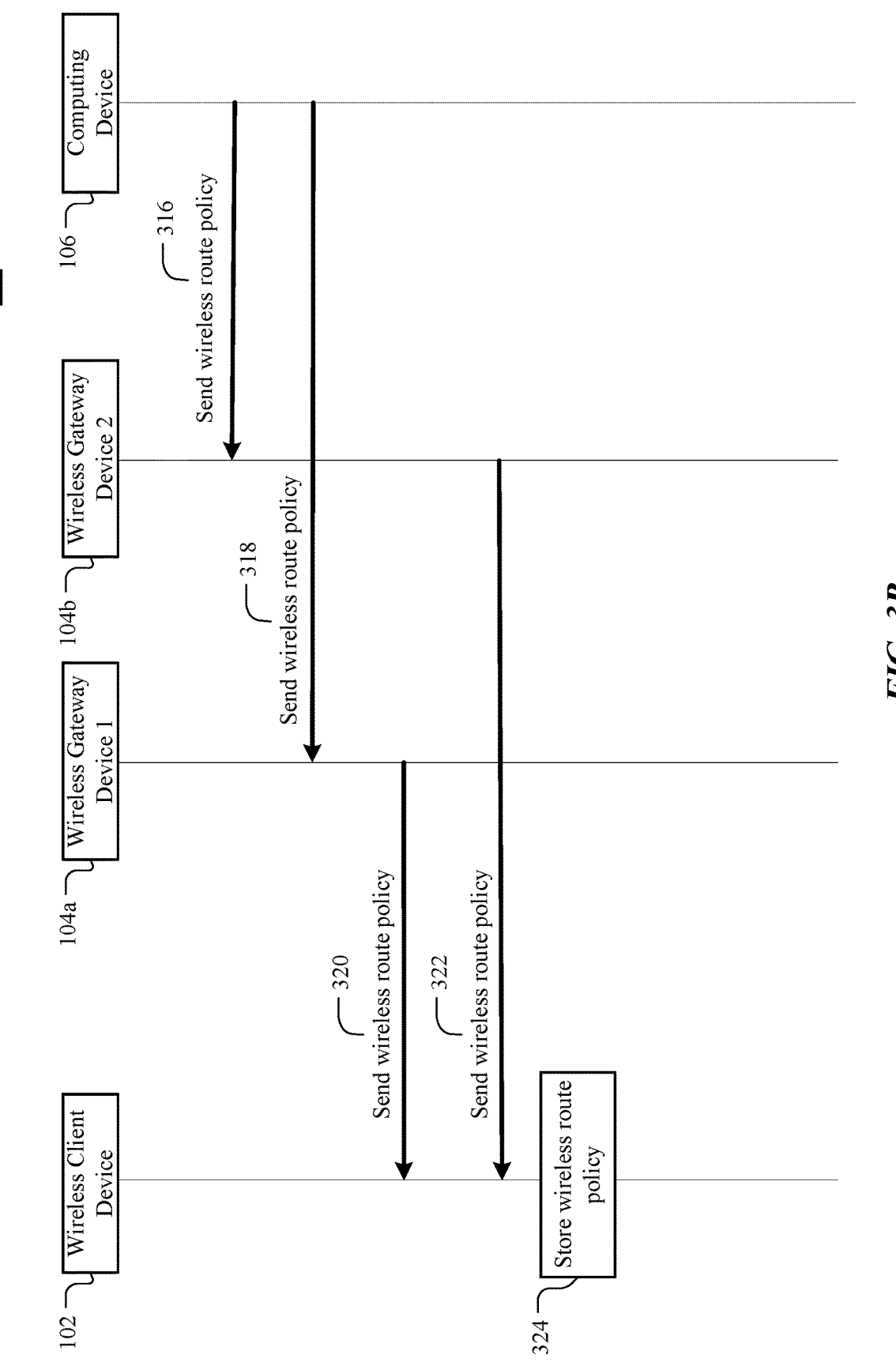

FIGS. 3A-3B illustrate an example process 300 flow of a wireless data transmission system. Referring to FIG. 3A, in particular embodiments, the process 300 may include a wireless client device 102, a wireless gateway device 1 104a, a wireless gateway device 2 104b, and a computing device 106. While this figure illustrates a particular number of devices in a particular arrangement, this disclosure contemplates any number of devices in any suitable arrangement. As an example and not by way of limitation, there may be multiple wireless client devices 102 and additional wireless gateway devices 104. In particular embodiments, the process may start at step 302 where the wireless client device 102 captures data. The data collected may be from one or more sensors of the wireless client device 102 as described herein. At step 303, the wireless client device 102 may break down the data collected into one or more data packets as described herein. As an example and not by way of limitation, the wireless client device 102 may determine to send data to a computing device 106 via one or more wireless gateway devices 104 and generates a data stream from the captured data. The data stream is then broken up into one or more data packets based on a wireless route policy stored on the wireless client device 102 as described herein. In particular embodiments, during the initial registering of the wireless client device 102 and prior to the initial data transfer to the computing device 106, the wireless client device 102 may be sent a wireless route policy to configure data transmission based on data received by the computing device 106. As an example and not by way of limitation, the wireless route policy may initially be based on a number of wireless gateway devices 104 are connected to the wireless client device 102, a number of wireless client devices 102 on the network, an efficiency metric associated with the wireless gateway devices 104 based on previous data transmission using the respective wireless gateway devices 104. At step 304, the wireless client device 102 may send a data packet to wireless gateway device 1 104*a* based on the wireless route policy. At step 306, the wireless client device 102 may send a data packet to wireless gateway device 2 104*b* based on the wireless route policy.

At step 308, the wireless gateway device 1 104*a* may send the data packet received from the wireless client device 102 to the computing device 106. At step 310, the wireless gateway device 2 104*b* may send the data packet received from the wireless client device 102 to the computing device 106. At step 312, the computing device 106 may compile the data received from the wireless gateway devices 104. At step 314, the computing device 106 may determine a wireless route policy for the wireless client device 102. The computing device 106 may perform an analysis on one or more transmission metrics corresponding to the data transfer between the wireless client device 102 and the wireless gateway devices 104 as described herein. The computing device 106 may use a machine-learning model to generate a wireless route policy based on the one or more transmission metrics as described herein.

Referring to FIG. 3B, the process 300 may continue at step 316, where the computing device 106 may send the generated wireless route policy to the wireless gateway device 2 104*b* to send to the wireless client device 102. At step 318, the computing device may send the wireless route policy to the wireless gateway device 1 104*a*. At step 320, the wireless gateway device 1 104*a* may send the wireless route policy to the wireless client device 102. At step 322, the wireless gateway device 2 104*b* may send the wireless route policy to the wireless client device 102. At step 324, the wireless client device 102 may store the wireless route policy and update its data transmission protocol based on the wireless route policy. Although FIGS. 3A-3B illustrate the process 300 being performed in a particular order, the steps may be rearranged in any suitable order. As an example and not by way of limitation, steps 316 and 318 may be performed in reverse or simultaneously.

FIG. 4 illustrates is a flow diagram of a method 400 for wireless data transmission, in accordance with the presently disclosed embodiments. The method 400 may be performed utilizing one or more processing devices (e.g., computing device 106) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing data, software (e.g., instructions running/executing on one or more processors), firmware (e.g., microcode), or some combination thereof.

The method 400 may begin at step 410 with the one or more processing devices (e.g., computing device 106) receiving, from a first wireless client device via a plurality of wireless gateway devices, a first data stream comprising a first plurality of data packets. In particular embodiments, each data packet may comprise context data corresponding to a prior context of the first wireless client device when sending the respective data packet. The method 400 may then continue at step 420 with the one or more processing devices (e.g., computing device 106) analyzing, using a machine-learning model, one or more first transmission metrics based on the reception of the first plurality of data packets from the plurality of wireless gateway devices and the context data of the respective data packets. The method 400 may then continue at step 430 with the one or more processing devices (e.g., computing device 106) generating, using the machine-learning model, a first wireless route policy to configure data transmission of the first wireless client device based on the one or more first transmission metrics and a current context of the first wireless client device. In particular embodiments, the first wireless route policy specifies rules for sending data packets via particular wireless gateway devices based on the current context of the first wireless client device. The method 400 may then continue at step 440 with the one or more processing devices (e.g., computing device 106) sending, to the first wireless client device via one or more of the wireless gateway devices, instructions for configuring the first wireless client device according to the first wireless route policy. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for wireless data transmission including the particular steps of the method of FIG. 4, this disclosure contemplates any suitable method for wireless data transmission including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Systems and Methods

Figure 5:
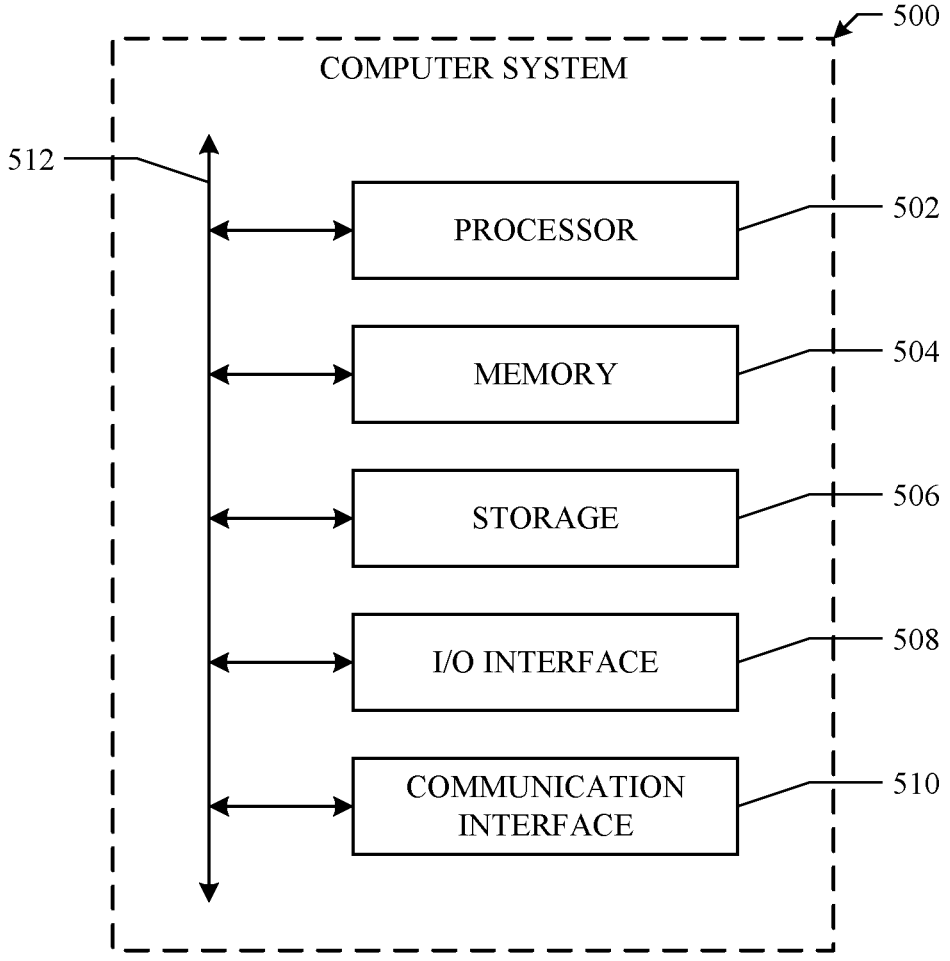
FIG. 5 illustrates an example computer system.

FIG. 5 illustrates an example computer system 500 that may be utilized to perform determining a predicted touch location of a touch input, in accordance with the presently disclosed embodiments. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks.

Where appropriate, one or more computer systems 500 may perform without substantial spatial or temporal limitation one or more steps of one or more methods described or illustrated herein. As an example, and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement. In particular embodiments, processor 502 includes hardware for executing instructions, such as those making up a computer program. As an example, and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502.

Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example, and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere).

One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memory devices 504, where appropriate. Although this disclosure describes and illustrates particular memory, this disclosure contemplates any suitable memory.

In particular embodiments, storage 506 includes mass storage for data or instructions. As an example, and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 506 for them. Where appropriate, I/O interface 508 may include one or more device or software drivers enabling processor 502 to drive one or more of these I/O devices. I/O interface 508 may include one or more I/O interfaces 506, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example, and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it.

As an example, and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example, and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

AI Architecture

Figure 6:
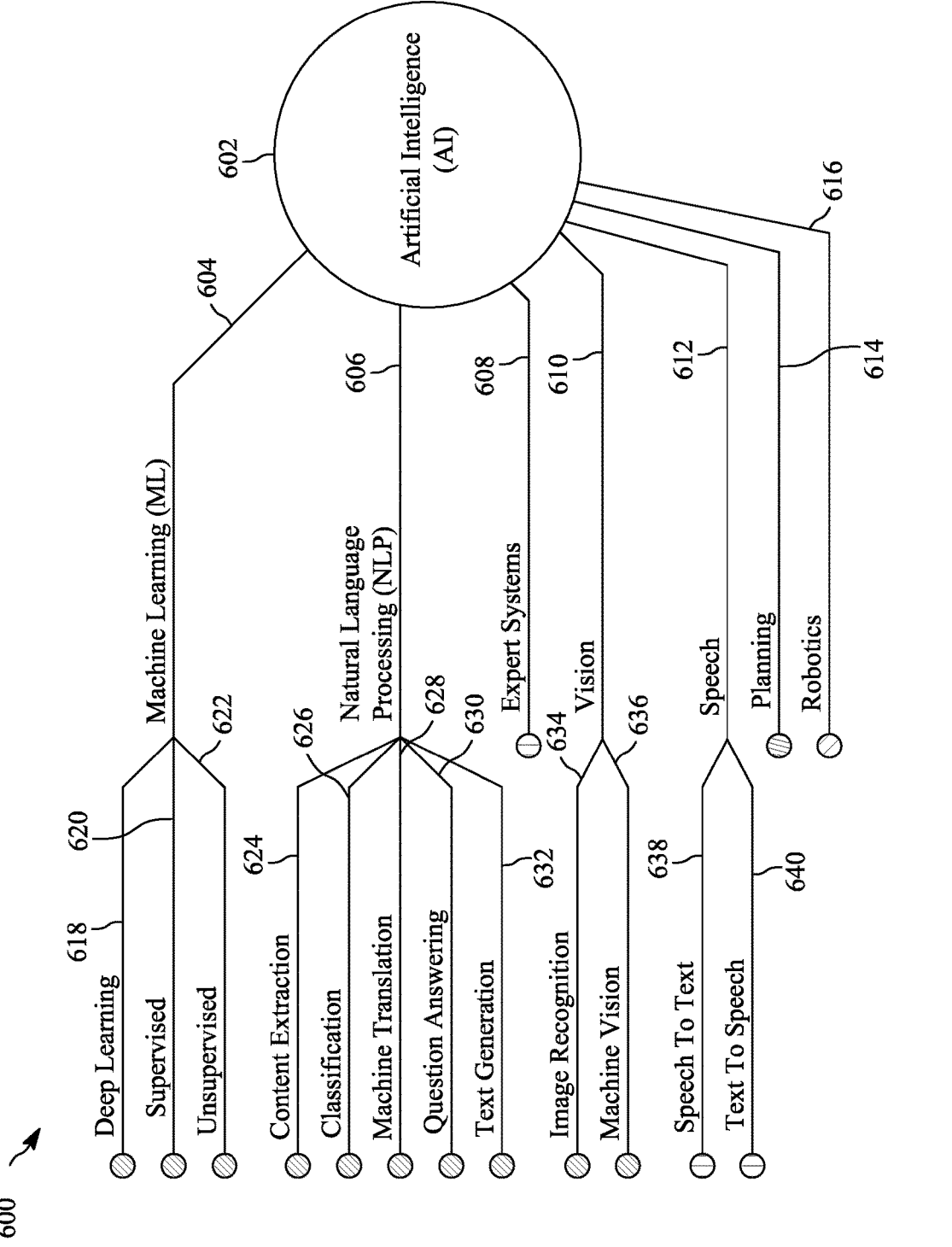
FIG. 6 illustrates a diagram of an example artificial intelligence (AI) architecture.

FIG. 6 illustrates a diagram 600 of an example artificial intelligence (AI) architecture 602 that may be utilized to perform determining a set of predicted coordinates of a touch input, in accordance with the presently disclosed embodiments. In particular embodiments, the AI architecture 602 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 6, the AI architecture 602 may include machine leaning (ML) algorithms and functions 604, natural language processing (NLP) algorithms and functions 606, expert systems 608, computer-based vision algorithms and functions 610, speech recognition algorithms and functions 612, planning algorithms and functions 614, and robotics algorithms and functions 616. In particular embodiments, the ML algorithms and functions 604 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 604 may include deep learning algorithms 618, supervised learning algorithms 620, and unsupervised learning algorithms 622.

In particular embodiments, the deep learning algorithms 618 may include any artificial neural networks (ANNs) that may be utilized to learn deep levels of representations and abstractions from large amounts of data. For example, the deep learning algorithms 618 may include ANNs, such as a multilayer perceptron (MLP), an autoencoder (AE), a convolution neural network (CNN), a recurrent neural network (RNN), long short term memory (LSTM), a gated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 620 may include any algorithms that may be utilized to apply, for example, what has been learned in the past to new data using labeled examples for predicting future events. For example, starting from the analysis of a known training dataset, the supervised learning algorithms 620 may produce an inferred function to make predictions about the output values. The supervised learning algorithms 620 can also compare its output with the correct and intended output and find errors in order to modify the supervised learning algorithms 620 accordingly. On the other hand, the unsupervised learning algorithms 622 may include any algorithms that may applied, for example, when the data used to train the unsupervised learning algorithms 622 are neither classified or labeled. For example, the unsupervised learning algorithms 622 may study and analyze how systems may infer a function to describe a hidden structure from unlabeled data.

In particular embodiments, the NLP algorithms and functions 606 may include any algorithms or functions that may be suitable for automatically manipulating natural language, such as speech and/or text. For example, in particular embodiments, the NLP algorithms and functions 606 may include content extraction algorithms or functions 624, classification algorithms or functions 626, machine translation algorithms or functions 628, question answering (QA) algorithms or functions 630, and text generation algorithms or functions 632. In particular embodiments, the content extraction algorithms or functions 624 may include a means for extracting text or images from electronic documents (e.g., webpages, text editor documents, and so forth) to be utilized, for example, in other applications.

In particular embodiments, the classification algorithms or functions 626 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 628 may include any algorithms or functions that may be suitable for automatically converting source text in one language, for example, into text in another language. The QA algorithms or functions 630 may include any algorithms or functions that may be suitable for automatically answering questions posed by humans in, for example, a natural language, such as that performed by voice-controlled personal assistant devices. The text generation algorithms or functions 632 may include any algorithms or functions that may be suitable for automatically generating natural language texts.

In particular embodiments, the expert systems 608 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 610 may include any algorithms or functions that may be suitable for automatically extracting information from images (e.g., photo images, video images). For example, the computer-based vision algorithms and functions 610 may include image recognition algorithms 634 and machine vision algorithms 636. The image recognition algorithms 634 may include any algorithms that may be suitable for automatically identifying and/or classifying objects, places, people, and so forth that may be included in, for example, one or more image frames or other displayed data. The machine vision algorithms 636 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 612 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 638 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 640 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:

receiving, from a first wireless client device via a plurality of wireless gateway devices, a first data stream comprising a first plurality of data packets, wherein each data packet comprises context data corresponding to a prior context of the first wireless client device when sending the respective data packet;

analyzing, using a machine-learning model, one or more first transmission metrics based on the reception of the first plurality of data packets from the plurality of wireless gateway devices and the context data of the respective data packets;

generating, using the machine-learning model, a first wireless route policy to configure data transmission of the first wireless client device based on the one or more first transmission metrics and a current context of the first wireless client device, wherein the first wireless route policy specifies rules for sending data packets via particular wireless gateway devices based on the current context of the first wireless client device;

sending, to the first wireless client device via one or more of the plurality of wireless gateway devices, instructions for configuring the first wireless client device to transmit a second data stream according to the first wireless route policy; and updating the first wireless route policy based on one or more second transmission metrics determined by the machine-learning model based on the second data stream.

2. The method of claim 1, further comprising:

receiving, from the first wireless client device, one or more data packets of a second plurality of data packets through a first wireless gateway device for a first context based on the first wireless route policy; and receiving, from the first wireless client device, one or more data packets of a second plurality of data packets through a second wireless gateway device for a second context based on the first wireless route policy.

3. The method of claim 1, wherein the first wireless route policy specifies one or more of time-based rules, location-based rules, or bandwidth-based rules for the first wireless client device to send the data packets via the particular wireless gateway devices.

4. The method of claim 1, further comprising:

receiving, from the first wireless client device via the plurality of wireless gateway devices based on the first wireless route policy, the second data stream comprising a second plurality of data packets, wherein each data packet comprises context data corresponding to a second prior context of the first wireless client device when sending the respective data packet;

analyzing, using the machine-learning model, the one or more second transmission metrics based on the reception of the second plurality of data packets from the plurality of wireless gateway devices, the context data of the respective data packets, and the first wireless route policy;

updating, using the machine-learning model, the first wireless route policy to generate a second wireless route policy to configure data transmission of the first wireless client device based on the one or more second transmission metrics and a current context of the first wireless client device; and sending, to the first wireless client device via one or more of the plurality of wireless gateway devices, instructions for configuring the first wireless client device according to the second wireless route policy, wherein the second wireless route policy replaces the first wireless route policy.

5. The method of claim 1, further comprising:

compiling the first plurality of data packets to generate the first data stream, wherein the one or more first transmission metrics are based on the generation of the first data stream from the first plurality of data packets.

6. The method of claim 1, further comprising:

receiving the one or more first transmission metrics from one or more wireless gateway devices of the plurality of wireless gateway devices, wherein the one or more first transmission metrics are determined by the one or more wireless gateway devices.

7. The method of claim 1, further comprising:

receiving, from a second wireless client device via the plurality of wireless gateway devices, a third data stream comprising a third plurality of data packets, wherein each data packet comprises context data corresponding to a prior context of the second wireless client device when sending the respective data packet;

analyzing, using the machine-learning model, the one or more first transmission metrics and the one or more second transmission metrics based on the reception of the third plurality of data packets from the plurality of wireless gateway devices and the context data of the respective data packets;

generating, using the machine-learning model, a second wireless route policy to configure data transmission of the first wireless client device and the second wireless client device based on one or more wireless route policy parameters comprising the one or more first transmission metrics, the one or more second transmission metrics, a current context of the first wireless client device, and a current context of the second wireless client device, wherein the second wireless route policy specifies rules for sending data packets via particular wireless gateway devices based on the current context of the respective wireless client device; and sending, to the first wireless client device and the second wireless client device, respectively, via one or more of the plurality of wireless gateway devices, instructions for configuring the respective wireless client device according to the second wireless route policy.

8. An electronic device comprising:

one or more non-transitory computer-readable storage media including instructions; and one or more processors coupled to the storage media, the one or more processors configured to execute the instructions to:

receive, from a first wireless client device via a plurality of wireless gateway devices, a first data stream comprising a first plurality of data packets, wherein each data packet comprises context data corresponding to a prior context of the first wireless client device when sending the respective data packet;

analyze, using a machine-learning model, one or more first transmission metrics based on the reception of the first plurality of data packets from the plurality of wireless gateway devices and the context data of the respective data packets;

generate, using the machine-learning model, a first wireless route policy to configure data transmission of the first wireless client device based on the one or more first transmission metrics and a current context of the first wireless client device, wherein the first wireless route policy specifies rules for sending data packets via particular wireless gateway devices based on the current context of the first wireless client device;

send, to the first wireless client device via one or more of the plurality of wireless gateway devices, instructions for configuring the first wireless client device to transmit a second data stream according to the first wireless route policy; and update the first wireless route policy based on one or more second transmission metrics determined by the machine-learning model based on the second data stream.

9. The electronic device of claim 8, wherein the processors are further configured to execute the instructions to:

receive, from the first wireless client device, one or more data packets of a second plurality of data packets through a first wireless gateway device for a first context based on the first wireless route policy; and receive, from the first wireless client device, one or more data packets of a second plurality of data packets through a second wireless gateway device for a second context based on the first wireless route policy.

10. The electronic device of claim 8, wherein the first wireless route policy specifies one or more of time-based rules, location-based rules, or bandwidth-based rules for the first wireless client device to send the data packets via the particular wireless gateway devices.

11. The electronic device of claim 8, wherein the processors are further configured to execute the instructions to:

receive, from the first wireless client device via the plurality of wireless gateway devices based on the first wireless route policy, the second data stream comprising a second plurality of data packets, wherein each data packet comprises context data corresponding to a second prior context of the first wireless client device when sending the respective data packet;

analyze, using the machine-learning model, the one or more second transmission metrics based on the reception of the second plurality of data packets from the plurality of wireless gateway devices, the context data of the respective data packets, and the first wireless route policy;

update, using the machine-learning model, the first wireless route policy to generate a second wireless route policy to configure data transmission of the first wireless client device based on the one or more second transmission metrics and a current context of the first wireless client device; and send, to the first wireless client device via one or more of the plurality of wireless gateway devices, instructions for configuring the first wireless client device according to the second wireless route policy, wherein the second wireless route policy replaces the first wireless route policy.

12. The electronic device of claim 8, wherein the processors are further configured to execute the instructions to:

compile the first plurality of data packets to generate the first data stream, wherein the one or more first transmission metrics are based on the generation of the first data stream from the first plurality of data packets.

13. The electronic device of claim 8, wherein the processors are further configured to execute the instructions to:

receive the one or more first transmission metrics from one or more wireless gateway devices of the plurality of wireless gateway devices, wherein the one or more first transmission metrics are determined by the one or more wireless gateway devices.

14. The electronic device of claim 8, wherein the processors are further configured to execute the instructions to:

receive, from a second wireless client device via the plurality of wireless gateway devices, a third data stream comprising a third plurality of data packets, wherein each data packet comprises context data corresponding to a prior context of the second wireless client device when sending the respective data packet;

analyze, using the machine-learning model, the one or more first transmission metrics and the one or more second transmission metrics based on the reception of the third plurality of data packets from the plurality of wireless gateway devices and the context data of the respective data packets;

generate, using the machine-learning model, a second wireless route policy to configure data transmission of the first wireless client device and the second wireless client device based on one or more wireless route policy parameters comprising the one or more first transmission metrics, the one or more second transmission metrics, a current context of the first wireless client device, and a current context of the second wireless client device, wherein the second wireless route policy specifies rules for sending data packets via particular wireless gateway devices based on the current context of the respective wireless client device; and send, to the first wireless client device and the second wireless client device, respectively, via one or more of the plurality of wireless gateway devices, instructions for configuring the respective wireless client device according to the second wireless route policy.

15. A computer-readable non-transitory storage media comprising instructions executable by a processor to:

receive, from a first wireless client device via a plurality of wireless gateway devices, a first data stream comprising a first plurality of data packets, wherein each data packet comprises context data corresponding to a prior context of the first wireless client device when sending the respective data packet;

analyze, using a machine-learning model, one or more first transmission metrics based on the reception of the first plurality of data packets from the plurality of wireless gateway devices and the context data of the respective data packets;

generate, using the machine-learning model, a first wireless route policy to configure data transmission of the first wireless client device based on the one or more first transmission metrics and a current context of the first wireless client device, wherein the first wireless route policy specifies rules for sending data packets via particular wireless gateway devices based on the current context of the first wireless client device;

send, to the first wireless client device via one or more of the plurality of wireless gateway devices, instructions for configuring the first wireless client device to transmit a second data stream according to the first wireless route policy; and update the first wireless route policy based on one or more second transmission metrics determined by the machine-learning model based on the second data stream.

16. The media of claim 15, wherein the instructions are further executable by the processor to:

receive, from the first wireless client device, one or more data packets of a second plurality of data packets through a first wireless gateway device for a first context based on the first wireless route policy; and receive, from the first wireless client device, one or more data packets of a second plurality of data packets through a second wireless gateway device for a second context based on the first wireless route policy.

17. The media of claim 15, wherein the first wireless route policy specifies one or more of time-based rules, location-based rules, or bandwidth-based rules for the first wireless client device to send the data packets via the particular wireless gateway devices.

18. The media of claim 15, wherein the instructions are further executable by the processor to:

receive, from the first wireless client device via the plurality of wireless gateway devices based on the first wireless route policy, the second data stream comprising a second plurality of data packets, wherein each data packet comprises context data corresponding to a second prior context of the first wireless client device when sending the respective data packet;

analyze, using the machine-learning model, the one or more second transmission metrics based on the reception of the second plurality of data packets from the plurality of wireless gateway devices, the context data of the respective data packets, and the first wireless route policy;

update, using the machine-learning model, the first wireless route policy to generate a second wireless route policy to configure data transmission of the first wireless client device based on the one or more second transmission metrics and a current context of the first wireless client device; and send, to the first wireless client device via one or more of the plurality of wireless gateway devices, instructions for configuring the first wireless client device according to the second wireless route policy, wherein the second wireless route policy replaces the first wireless route policy.

19. The media of claim 15, wherein the instructions are further executable by the processor to:

compile the first plurality of data packets to generate the first data stream, wherein the one or more first transmission metrics are based on the generation of the first data stream from the first plurality of data packets.

20. The media of claim 15, wherein the instructions are further executable by the processor to:

receive the one or more first transmission metrics from one or more wireless gateway devices of the plurality of wireless gateway devices, wherein the one or more first transmission metrics are determined by the one or more wireless gateway devices.

* * * * *